(12) United States Patent
Jannick et al.

(10) Patent No.: US 6,814,884 B2
(45) Date of Patent: Nov. 9, 2004

(54) METHOD OF TRANSFERRING HEAT USING A WORKING FLUID CONTAINING 1,1,1,3,3-PENTAFLUOROBUTANE AS REFRIGERANT OR HEAT TRANSFER MEDIUM

(75) Inventors: Peter Jannick, Hannover (DE); Christoph Meurer, Hannover (DE)

(73) Assignee: Solvay Fluor und Derivate GmbH, Hannover (DE)

( * ) Notice: Subject to any disclaimer, the term of this patent is extended or adjusted under 35 U.S.C. 154(b) by 0 days.

(21) Appl. No.: 10/438,269

(22) Filed: May 15, 2003

(65) Prior Publication Data

US 2004/0031948 A1 Feb. 19, 2004

Related U.S. Application Data

(63) Continuation of application No. PCT/EP01/12957, filed on Nov. 9, 2001.

(30) Foreign Application Priority Data

Nov. 15, 2000 (DE) .......................................... 100 56 606

(51) Int. Cl.[7] .............................................. C09K 5/00
(52) U.S. Cl. .............................. 252/67; 62/112; 62/532
(58) Field of Search ...................... 252/67, 68; 62/112, 62/532

(56) References Cited

U.S. PATENT DOCUMENTS 5,688,431 A    11/1997    Minor 6,080,799 A  *  6/2000   Kruecke et al. ............ 521/131

FOREIGN PATENT DOCUMENTS

| DE | 19725360 | 6/1998 |
|---|---|---|
| WO | 00/36046 | 6/2000 |

OTHER PUBLICATIONS

Nick Campbell, et al., "Coping without the common coolant" Chemistry and Industry, Apr. 5, 1999.

Vaishali Naik, et al., "Consistent sets of atmospheric lifetimes and radiative forcings on climate for CFC replacements: HCFCs and HFCs" Journal of Geophysical Research, vol. 105, pp. 690–6914, 2000.

Search Report.

* cited by examiner

Primary Examiner—Necholus Ogden
(74) Attorney, Agent, or Firm—Crowell & Moring LLP

(57) ABSTRACT

A method of using mixtures consisting essentially of 1,1,1,3,3-pentafluorobutane (R365mfc) and at least one further partially fluorinated hydrocarbon selected from the group consisting of 1,1,1,2-tetrafluoroethane (R134a), pentafluoroethane (R125), 1,1,1,3,3-pentafluoropropane (R245fa) and 1,1,1,2,3,3,3-heptafluoropropane (R227ea) as the working fluid in high-temperature heat pumps. The refrigerant mixtures used according to the invention exhibit a high temperature glide.

8 Claims, 1 Drawing Sheet

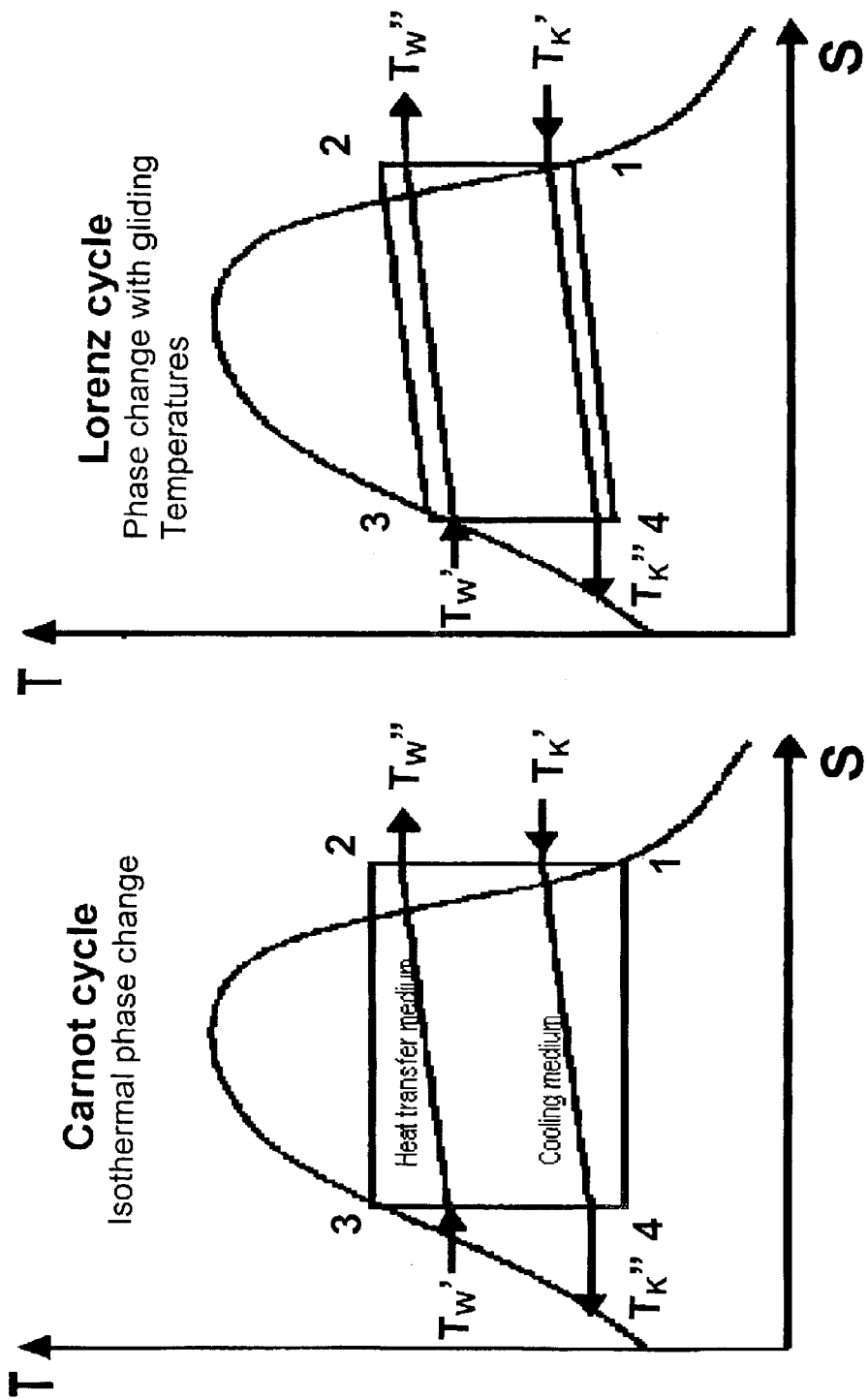

METHOD OF TRANSFERRING HEAT USING A WORKING FLUID CONTAINING 1,1,1,3,3-PENTAFLUOROBUTANE AS REFRIGERANT OR HEAT TRANSFER MEDIUM

CROSS REFERENCE TO RELATED APPLICATIONS

This application is a continuation of international patent application no. PCT/EP01/12957, filed Nov. 9, 2001, designating the United States of America, and published in German as WO 02/40613, the entire disclosure of which is incorporated herein by reference. Priority is claimed based on Federal Republic of Germany patent application no. DE 100 56 606.5, filed Nov. 15, 2000.

BACKGROUND OF THE INVENTION

The invention relates to the use of mixtures consisting of 1,1,1,3,3-pentafluorobutane (R365mfc) and at least one further partially fluorinated hydrocarbon as heat transfer medium or refrigerant, preferably as the working fluid in high-temperature heat pumps.

For ecological reasons, in particular with regard to the effect on the ozone layer, environmentally acceptable substitutes for fluorochlorohydrocarbons (FCHCs) such as R12, R502 and partially halogenated FCHCs such as R22, are being used instead to an increasing extent in refrigeration and air conditioning. Only for the field of high-temperature heat pumps is there no suitable refrigerant available at present. In the past, R114, a fluorochlorohydrocarbon (FCHC), has been used for such applications with high condensation temperatures of 100° C. and above. Since this working fluid is included among the ozone-depleting substances listed in the Montreal Protocol and may no longer be used, a suitable substitute must be found.

Unpublished European Patent Application EP 99 20 0762.5 discloses a mixture containing 1,1,1,3,3-pentafluorobutane and at least one non-combustible partially fluorinated hydrocarbon with more than 3 carbon atoms and its suitability as refrigerant or heat transfer medium. No statements are made therein about the suitability of these mixtures for high-temperature heat pumps.

SUMMARY OF THE INVENTION

The object of the invention is to provide an improved method of transferring heat at high temperatures.

Another object of the invention is to provide a method of transferring heat which utilizes an improved working fluid composition, which in contrast to the refrigerants known hitherto, has a high temperature glide and a high critical temperature.

It is an object of the invention to provide a heat pump with an improved working fluid.

These and other objects are achieved in accordance with the present invention by providing a method of transferring heat comprising the steps of absorbing heat with a working fluid in an evaporator stage; transferring the working fluid with absorbed heat to a condenser stage, and releasing heat from the working fluid in the condenser stage, in which the working fluid consists essentially of 1,1,1,3,3-pentafluorobutane (R365mfc) and at least one further partially fluorinated hydrocarbon selected from the group consisting of 1,1,1,2-tetrafluoroethane (R134a), pentafluoroethane (R125), 1,1,1,3,3-pentafluoropropane (R245fa) and 1,1,1,2,3,3,3-heptafluoropropane (R227ea).

In accordance with a further aspect of the invention, the objects are achieved by providing a heat pump operating at a temperature above 70° C., wherein said heat pump is filled with a working fluid consisting essentially of 1,1,1,3,3-pentafluorobutane (R365mfc) and at least one further partially fluorinated hydrocarbon selected from the group consisting of 1,1,1,2-tetrafluoroethane (R134a), pentafluoroethane (R125), 1,1,1,3,3-pentafluoropropane (R245fa) and 1,1,1,2,3,3,3-heptafluoropropane (R227ea).

The criteria for selecting the working fluid or refrigerant mixture are the refrigeration and heat performance coefficients, the temperature glide in the condenser and in the evaporator and also the end compression temperatures.

According to the invention, a working fluid mixture is used which contains or consists essentially of 1,1,1,3,3-pentafluorobutane (R365mfc) and at least one partially fluorinated hydrocarbon from the group consisting of 1,1,1,2-tetrafluoroethane (R134a), pentafluoroethane (R125), 1,1,1,3,3-pentafluoropropane (R245fa) and 1,1,1,2,3,3,3-heptafluoropropane (R227ea).

Compositions which contain 1,1,1,3,3-pentafluorobutane and at least one constituent selected from the group consisting of 1,1,1,2-tetrafluoroethane, pentafluoroethane and 1,1,1,2,3,3,3-heptafluoropropane, are particularly advantageous.

In one embodiment, the mixtures according to the invention may be binary, i.e. R365mfc with a further constituent, or ternary, i.e. R365mfc with two further constituents, compositions.

Preferred binary compositions contain 1,1,1,3,3-pentafluorobutane and as a second constituent 1,1,1,2-tetrafluoroethane or pentafluoroethane or 1,1,1,3,3-pentafluoropropane or 1,1,1,2,3,3,3-heptafluoropropane.

Preferred ternary compositions contain 1,1,1,3,3-pentafluorobutane, 1,1,1,2-tetrafluoroethane and 1,1,1,2,3,3,3-heptafluoropropane or 1,1,1,3,3-pentafluorobutane, 1,1,1,2-tetrafluoroethane and 1,1,1,3,3-pentafluoropropane.

The mixtures used according to the invention advantageously contain 40 to 95 mass-% of 1,1,1,3,3-pentafluorobutane and amounts of from 5 to 60 mass-% of at least one partially fluorinated hydrocarbon selected from the group consisting of 1,1,1,2-tetrafluoroethane, pentafluoroethane, 1,1,1,3,3-pentafluoropropane and 1,1,1,2,3,3,3-heptafluoropropane.

Table 1 shows characteristic variables of the refrigerants for high-temperature heat pumps.

TABLE 1 refrigerants for high-temperature heat pumps

| | | Boiling point ° C. | Critical variables | |
|---|---|---|---|---|
| | Molecular weight | at 1.013 bar | tc (° C.) | pc (bar) |
| Hepta-fluoropropane | R227 | 170 | −18.3 | 103.5 | 29.5 |
| 1,1,1,3,3-penta-fluorobutane | R365mfc | 148 | 40.2 | 193 | 31.0 |
| Penta-fluoropropane | R245fa | 134 | 15.3 | 157.5 | 36.2 |
| Penta-fluoroethane | R125 | 120 | −48.1 | 66.3 | 36.3 |
| 1,1,1,2-tetra-fluoroethane | R134a | 102 | −26.1 | 101 | 40.6 |

In preferred embodiments, the following compositions are used as binary mixtures:

95–90 mass-% R365mfc and 5–10 mass-% R134a;
95–70 mass-% R365mfc and 5–30 mass-% R227a; 95 mass-% R365mfc and 5 mass-% R125; or
95–40 mass-% R365mfc and 5–60 mass-% R245fa.

In other preferred embodiments, the following compositions are used as ternary mixtures:
90–40 mass-% R365mfc, 5–40 mass-% R227ea and 5–20 mass-% R134a; or
90–40 mass-% R365mfc, 5–40 mass-% R245fa and 5–20 mass-% R134a.

It has been found that R365mfc forms a zeotropic mixture with the aforementioned constituents. Over the entire concentration range from 40 to 95 mass-% R365mfc and 5 to 60 mass-% of the partially fluorinated fluorohydrocarbon, the total of the constituents being 100 mass-%, these mixtures exhibit zeotropic behavior.

In the context of the invention, the term "zeotropic" is understood to mean that in the equilibrium state vapor and liquid have different compositions throughout the entire concentration range, since the boiling points of the individual mixture constituents are different. The evaporation and condensation processes do not take place at a constant temperature, but at a gliding temperature.

The term "temperature glide" is understood to mean the difference between the boiling and dewpoint temperatures at constant pressure. This effect can be utilized in heat transmission in heat exchangers if the heat transfer on the thermal sink or heat source likewise takes place under a gliding temperature. The energy losses can thus be reduced, particularly in the condenser.

In cold steam processes, the heat is given off in the condenser and the heat is absorbed in the evaporator. In industrial utilization, the heat dissipation and absorption may take place on a heat transfer medium or cooling medium. The heat transfer medium or cooling medium in that case undergoes a significant temperature step change.

The compositions according to the invention are advantageously suitable as refrigerants for industrial applications in which a stream of a substance must be cooled by a significant temperature step change >15 K.

A further field of use of such zeotropic mixtures is high-temperature heat pumps which operate at condensation temperatures of 70 to 120° C.

The compositions according to the invention are thus advantageously suitable as refrigerants in heat pumps which distribute the heat via a secondary circuit, usually water, in which the secondary circuit exhibits a significant temperature difference between the outward and return flow temperatures.

In particular the compositions according to the invention are suitable as refrigerants in heat pumps which in addition to a great temperature step change additionally require a high condensation temperature, e.g. in the range of 70 to 120° C.

The suitability of the mixtures according to the invention as refrigerants for high-temperature heat pumps will be illustrated by a calculation of a refrigerant circuit by way of an example.

The Carnot cycle is used as a comparison process for all types of refrigerating machinery. It consists of what are called isentropes and isotherms. The isentropes describe the state upon compression and expansion. The dissipation of heat in the condenser and the absorption of heat in the evaporator take place at constant temperatures and are represented by isotherms.

Zeotropic mixtures upon heat dissipation and heat absorption in the heat exchangers have what is called a temperature glide, i.e. the liquefaction and evaporation temperatures are not constant due to the different compositions at the same pressure. With zeotropic mixtures, the temperature in the condenser is reduced due to the temperature glide and the evaporation temperature increases.

Due to the so-called temperature control of the heat transfer medium and cooling medium in the condenser and evaporator, this property of zeotropic mixtures can be exploited industrially. The reaction takes place in practice with counter-current heat exchangers. The theoretical calculation can be made using what is called the Lorenz cycle. The Lorenz cycle takes into account the supply and removal of the heat at gliding temperature. As in the Carnot cycle, the isentropes describe the states of compression and expansion. For the isotherms of the Carnot cycle for the evaporation and liquefaction generalizing polytropes are provided, as shown in the attached drawing figure.

BRIEF DESCRIPTION OF THE DRAWING

The invention will be described in further detail hereinafter with reference to a working example illustrated by the Carnot and Lorenz cycle temperature(T)/entropy(S) diagram shown in the accompanying drawing FIGURE.

DETAILED DESCRIPTION OF ILLUSTRATIVE EMBODIMENTS

Points 1 to 4 in the accompanying drawing FIGURE describe the respective processes in the temperature/entropy (T/S) diagram. The temperature absorption and dissipation of the heat transfer medium and cooling medium are shown.

In the Carnot cycle, the driving temperature difference between heat transfer medium or cooling medium and refrigerant changes. In the Lorenz cycle it remains constant between heat transfer medium or cooling medium and refrigerant. The temperature glide of zeotropic mixtures can be utilized by temperature control of the heat transfer medium or cooling medium, i.e. constant driving temperature difference. The difference in the heat-exchanger entry and exit temperatures should in this case correspond to the temperature of the respective glide. Theoretically higher performance coefficients then are obtained for zeotropic refrigerant mixtures compared with single-component refrigerants.

The heat performance coefficient for the zeotropic mixture R365mfc/R227ea composed of 75/25 mass-% of the respective components and for the refrigerant R114 are calculated in the following working example of use. Process heat at a temperature of 20° C. is available as a heat source. This temperature is supplied to the evaporator with a cooling medium. The cooling medium is cooled to 10° C. in the evaporator. In the condenser, water at a temperature of 80° C. is heated to a low-pressure steam temperature of 10° C. The superheating of the theoretical circuit is 15K, the subcooling is 5K and the isentropic efficiency is 0.8.

The refrigerant mixture enters the evaporator at a temperature of 8.3° C. and leaves the evaporator at a temperature of 11.7° C. The evaporator glide is 3.4 K. The average evaporation temperature for the zeotropic refrigerant R365mfc/R227ea is 10° C. The refrigerant mixture enters the condenser at a temperature of 109° C. and leaves the condenser at a temperature of 90° C. The condenser glide is 19.8 K. The average condenser temperature is 100° C. The calculated heat performance coefficient is 2.40. In comparison with this, the heat performance coefficient for the same application with the refrigerant R114 is 2.3. The evaporation and condensation take place at constant temperatures. The following Table 2 shows characteristic calculated data.

TABLE 2

Comparison of performance data at a liquefaction temperature of 100° C., subcooling of 5 K, an evaporation temperature of 10° C., superheating of 15 K at an isentropic efficiency of 0.8

| Performance data | R114 | R365 mfc/R227 (75/25 mass - %) |
|---|---|---|
| Compressor performance in kW | 7.6 | 7.2 |
| Condenser performance in kW | 17.6 | 17.2 |
| Condenser glide in K | 0 | 19.8 |
| Evaporator performance in kW | 10.0 | 10.0 |
| Evaporator glide in K | 0 | 3.4 |
| Pressure ratio | 11.0 | 27.1 |
| Volumetric heat capacity in kJ/m$^3$ | 890.2 | 374.1 |
| Heat performance coefficient | 2.3 | 2.4 |

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method of transferring heat comprising the steps of absorbing heat with a working fluid in an evaporator stage; transferring the working fluid with absorbed heat to a condenser stage, and releasing heat from the working fluid in the condenser stage, wherein said working fluid consists essentially of 1,1,1,3,3-pentafluorobutane (R365mfc) and at least one further partially fluorinated hydrocarbon selected from the group consisting of 1,1,1,2-tetrafluoroethane (R134a), pentafluoroethane (R125), 1,1,1,3,3-pentafluoropropane (R245fa) and 1,1,1,2,3,3,3-heptafluoropropane (R227ea).

2. A method according to claim 1, wherein said working fluid consists essentially of 40 to 95 mass-% 1,1,1,3,3-pentafluorobutane and 5 to 60 mass-% of said at least one further partially fluorinated hydrocarbon.

3. A method according to claim 1, wherein said working fluid exhibits a high temperature glide.

4. A method according to claim 1, wherein said condensing stage is operated at a condensation temperature of at least 70° C.

5. A method according to claim 4, wherein said condensing stage is operated at a condensation temperature in the range from 70 to 120° C.

6. A method according to claim 4, wherein said condensing stage is operated at a condensation temperature of at least 100° C.

7. A method according to claim 4, wherein said method is effected in a heat pump operating at a temperature in the range from 70 to 120° C.

8. In a heat pump operating at a temperature above 70° C., the improvement comprising said heat pump being filled with a working fluid consisting essentially of 1,1,1,3,3-pentafluorobutane (R365mfc) and at least one further partially fluorinated hydrocarbon selected from the group consisting of 1,1,1,2-tetrafluoroethane (R134a), pentafluoroethane (R125), 1,1,1,3,3-pentafluoropropane (R245fa) and 1,1,1,2,3,3,3-heptafluoropropane (R227ea).

* * * * *